US009989977B2

United States Patent
Roper et al.

(10) Patent No.: US 9,989,977 B2
(45) Date of Patent: Jun. 5, 2018

(54) MECHANISM AND METHOD TO ADJUST SIZE OF BALANCED VALVE

(71) Applicant: EMERSON PROCESS MANAGEMENT REGULATOR TECHNOLOGIES, INC., McKinney, TX (US)

(72) Inventors: Daniel G. Roper, Lucas, TX (US); Harold J. McKinney, Durant, OK (US); Douglas James Scheffler, McKinney, TX (US); Jason D. Journey, Fairview, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 176 days.

(21) Appl. No.: 15/007,803

(22) Filed: Jan. 27, 2016

(65) Prior Publication Data

US 2016/0224035 A1 Aug. 4, 2016

Related U.S. Application Data

(60) Provisional application No. 62/110,377, filed on Jan. 30, 2015.

(51) Int. Cl.
*F16K 31/12* (2006.01)
*G05D 16/10* (2006.01)
*F16K 1/52* (2006.01)
*G05D 16/16* (2006.01)

(52) U.S. Cl.
CPC .......... *G05D 16/103* (2013.01); *F16K 1/523* (2013.01); *G05D 16/163* (2013.01); *Y10T 137/599* (2015.04); *Y10T 137/7834* (2015.04)

(58) Field of Classification Search
CPC . G05D 16/0669; F16K 31/126; F16K 15/185; F16K 15/186; F16K 1/52; Y10T 137/7929; Y10T 137/5994; Y10T 137/7834; Y10T 137/598; Y10T 137/599; Y10T 137/6065
See application file for complete search history.

(56) References Cited

U.S. PATENT DOCUMENTS 3,892,384 A * 7/1975 Myers ................ F16K 1/44
251/282
7,748,401 B2 * 7/2010 Zecchi ............... G05D 16/0647
137/315.05

(Continued)

FOREIGN PATENT DOCUMENTS

WO    WO-2006100603 A1    9/2006

OTHER PUBLICATIONS

Instruction Manual Form 5757, "EZH and EZHSO Series Pressure Reducing Regulators," Jan. 2015.

(Continued)

*Primary Examiner* — Jessica Cahill
(74) *Attorney, Agent, or Firm* — Marshall, Gerstein & Borun LLP

(57) ABSTRACT

A balanced valve trim, a regulator valve with a balanced valve trim, and methods for modifying a regulator valve with a balanced valve trim assembly to accommodate different volume flow rates through the regulator valve are disclosed.

20 Claims, 5 Drawing Sheets

(56) References Cited

U.S. PATENT DOCUMENTS

| 8,590,858 B2* | 11/2013 | Roper ................ G05D 16/0661 251/282 |
| 2008/0078460 A1 | 4/2008 | Roper et al. |
| 2013/0000756 A1 | 1/2013 | Griffin, Jr. et al. |

OTHER PUBLICATIONS

International Search Report for application No. PCT/2016/015606, dated May 27, 2016.
Written Opinion for application No. PCT/2016/015606, dated May 27, 2016.

* cited by examiner

MECHANISM AND METHOD TO ADJUST SIZE OF BALANCED VALVE

FIELD OF THE DISCLOSURE

The present application is directed toward a regulator valve, a balanced valve trim, and method of modifying a regulator valve with a balanced valve trim, which in some instances, may provide improved operating characteristics at over-capacity operating conditions.

BACKGROUND

Regulator valves (also called pressure regulators) are used in myriad industrial and residential applications for controlling the downstream pressure of a fluid. For example, in chemical processing plants or oil refineries, regulator valves are used to manipulate a flowing fluid to compensate for increases or decreases in demand, or other load disturbances, and thus keep the fluid pressure regulated. Similarly, regulator valves may be used in plumbing fixtures to maintain a pre-determined pressure of fluid that automatically adjusts to variations in demand, such as anti-scald valves in showers or faucets. By controlling downstream pressure, regulator valves compensate for variations in downstream demand. For example, as downstream demand increases, a typical regulator valve opens to allow more fluid to flow there through, thus maintaining a relatively constant downstream pressure. Conversely, as downstream demand decreases, the typical regulator valve closes to reduce the amount of fluid flowing there through, again maintaining a relatively constant downstream pressure.

Typical regulator valves can be categorized as either balanced or unbalanced. Typical unbalanced regulator valves have high pressure inlet fluid on one side (i.e., inlet or upstream side) of the valve plug and lower pressure outlet fluid on the other side (i.e., outlet or downstream side) of the valve plug. In the typical balanced regulator valve, a portion of the upstream fluid pressure is vented to act on a downstream portion of the valve plug so as to at least partially counterbalance the upstream and downstream pressures acting on the valve plug. Thus, the regulator valve is "balanced," having either the same fluid pressure acting on both upstream and downstream portions of the valve plug or at least a reduced pressure differential between the upstream and downstream portions of the valve plug.

FIG. 1 illustrates a known regulator valve arrangement, including a pressure regulator valve 10, a pilot 12, and a pilot supply filter regulator 14. The pilot 12 and the pilot supply filter regulator 14 are operatively connected with the outlet fluid stream and the pressure regulator valve 10 so as to provide a desired fluid pressure in the outlet fluid stream, in a manner understood in the art. In this arrangement, the regulator valve 10 includes a balanced valve trim assembly, as described generally hereinafter.

FIG. 2 illustrates a detailed exemplary arrangement of the regulator valve 10. The regulator valve 10 includes a valve body 16, an actuator 18 connected to the valve body, and a balanced valve trim assembly 20. The actuator 18 controls the position of the balanced valve trim assembly 20 within the valve body 16 so as to regulate the flow of fluid through the valve body. The actuator 18 moves a flow control member 32 between a fully open state, in which the maximum amount of fluid possible passes through the regulator valve 10, and a fully closed state, in which no fluid passes through the regulator valve 10, in response to the downstream fluid pressure exiting the regulator valve 10.

The valve body 16 defines a fluid flow path extending through an orifice or valve throat 26 and from an inlet 22 to an outlet 24. Further, a bonnet 25 operatively couples the actuator 18 to the valve body 16.

The valve trim assembly 20 includes a seat ring 28, a cage 30, and a flow control member 32. The seat ring 28 is disposed at the valve throat 26 and adapted to form a valve seat. The cage 30 affects the flow of fluid on the downstream side of the valve trim assembly 20, for example by reducing cavitation, improving laminar flow, and/or providing noise control. The flow control member 32 is arranged to move between the open position, in which a valve disk assembly is spaced apart from the seat ring 28, and the closed position, in which the valve disk assembly 34 is sealed against the seat ring 28, so as to control the flow of fluid through the valve throat 26. In this arrangement, the flow control member 32 includes the valve disk assembly 34, a sleeve adapter 36, and a sleeve 38. The valve disk assembly 34 includes a seal that sealingly engages the seat ring 28 when the flow control member 20 is in the fully closed position. The sleeve 38 forms a valve stem that operatively connects the valve disk assembly 34 with the actuator 18. The sleeve adapter 36 couples the valve disk assembly 34 to the sleeve 38.

The actuator 18 includes a diaphragm assembly 40, which is operatively disposed within an actuator housing 42 and operatively coupled to the sleeve 38. The actuator 18 is operatively coupled with the outlet fluid stream via the pilot 12 and the pilot supply filter regulator 14 so as to cause the diaphragm assembly 40 to move up and/or down within the actuator housing 42 in response to the fluid pressure at the outlet 24 of the valve body 16. In this arrangement, the actuator includes a spring 41 that pushes against one side of the diaphragm assembly 40, whereas the opposite side of the diaphragm assembly is exposed to the downstream fluid pressure exiting the regulator valve 10. The diaphragm assembly 40 is coupled to the sleeve 38 such that the diaphragm assembly 40 moves the sleeve 38 up and/or down along with the movement of the diaphragm assembly 40.

The sleeve 38 is in the form of an elongate hollow tube, preferably having a circular cylindrical shape, extending from a lower to an upper end. The sleeve adapter 36 is disposed in and fixed to the lower end of the sleeve 38, and the valve disk assembly 34 is fixedly coupled to the sleeve adapter 36. The upper end of the sleeve 38 is slidingly received within a blind bore formed in the top portion of the actuator housing 42. The lower end of the sleeve 38 is slidingly received through a through bore formed in the bottom portion of the actuator housing and aligned with the valve throat 26. The lower end of the sleeve 38 slides axially along the through bore, and the upper end of the sleeve 38 slides axially along the blind bore. Further, the exterior surface of the sleeve 38 is sealingly engaged against the interior surface of each of the through bore and the blind bore, such as with seals 43, so as to fluidly isolate the interior of the sleeve 38 from the rest of the interior of the actuator housing 42. Each of the valve disk assembly 34 and the sleeve adapter 36 has a centrally and axially aligned orifice, which together define a passageway 44 that fluidly couples the fluid flow path of the valve body 16 to the interior of the sleeve 38. Thus, the passageway 44 fluidly couples the upstream and the downstream sides of the valve disk assembly 34, which balances the fluid pressures on opposite sides of the valve disk assembly 34, thereby providing a balanced valve trim assembly.

FIG. 3 shows the sleeve 38, the sleeve adapter 36, the valve disk assembly 34, and the seat ring 28 in isolation. As illustrated by arrow A, fluid from the inlet 22 passes through the seat ring 28 (and thus also the throat 26) and through the passageway 44 defined by the sleeve adapter 36 and the valve disk assembly 34 into the interior of the sleeve 38, thereby equalizing pressure on opposite sides of the valve disk assembly 34.

In such a known regulator valve arrangement, the regulator valve 10 is preferably sized such that the application requirements of the entire arrangement are met within a preferred operating range somewhere near the middle of the travel distance of the closure member 32 without the need to operate the regulator valve 10 too close to either travel extreme of the valve trim, i.e., with the flow control member 32 either at or particularly near the fully open state or at or very near the fully closed state. In some arrangements and/or under some operating conditions, the regulator valve 10 may be too large for the expected operating conditions. This may occur, for example, if the operating conditions are changed after the regulator valve has already been installed along a pipeline. This may cause the flow control member 32 to operate very close to the valve seat 28 under the new expected operating conditions. If the flow control member 32 has a soft seat, such as a soft valve disk or plug, this condition can cause damage to the seat material, which in some cases could prevent the regulator valve from shutting off as necessary. Although this condition in some circumstances might be addressed by providing a smaller valve, this solution is often not viable for other practical considerations.

One way of adjusting the effective size of the balanced valve trim assembly to address this condition of having an oversized regulator valve is to install a smaller valve seat at the valve throat 26. The drawback of this strategy, however, is that they cannot be as effectively utilized under operating conditions that run at higher pressures, apparently due to imbalances caused by the smaller valve seat.

SUMMARY

According to some aspects of the present disclosure, a balanced valve trim for a pressure regulator valve is provided that has advantageous operating characteristics under volume flow operating conditions that are lower than the originally developed designed-for operating conditions for that regulator valve. In one arrangement, a balanced valve trim for a regulator valve includes a seat defining a flow through orifice for fluid flowing through a valve body and a flow control member for controlling flow of the fluid through the flow through orifice. The flow control member includes a sleeve and a valve disk assembly. The sleeve is to be operatively connected to an actuator so as to move toward and away from the seat. The sleeve has an interior space extending along the sleeve between a first end and a second end. The valve disk assembly is disposed at the second end and arranged to engage the seat. The valve disk assembly includes a passageway to provide fluid communication with the interior space. A first effective pressure area is formed at the first end of the interior space, and a second effective pressure area is defined at the second end of the interior space. The second effective pressure area opposes the first effective pressure area.

According to some aspects of the present disclosure, a regulator valve is provided that provides advantageous operating characteristics under lower volume flow operating conditions. In one arrangement, the regulator valve includes a valve body defining a fluid flow passage having a valve throat disposed between an inlet and an outlet, an actuator operatively coupled to the valve body, and a balanced valve trim. The balanced valve trim includes a seat ring, a flow control member, and a plunger. The seat ring is coupled to the valve body and defines a flow through orifice having a first cross-sectional area. The flow control member includes a sleeve operatively connected to the actuator so as to move a valve disk assembly toward and away from the seat ring so as to control flow of fluid through the fluid flow passage. The sleeve has an interior space disposed between a first end of the sleeve and a second end of the sleeve. The valve disk assembly is disposed at the second end of the sleeve, and an inner annular shoulder is disposed toward a the first end of the sleeve and spaced apart from the valve disk assembly to at least partially define the interior space. A through bore extends through the inner annular shoulder, and the valve disk assembly includes a passageway to provide fluid communication between the fluid flow passage and the interior space. The plunger is slidingly disposed within the through bore and fixed relative to the valve body.

According to some aspects of the present disclosure, a method is provided for modifying a regulator valve to have different operating characteristics under volume flow operating conditions that are lower than the originally developed designed for operating conditions of that regulator valve. In one arrangement a method of modifying a pressure regulator valve having an existing balanced valve trim with a sliding valve stem in the form of a sleeve is provided. The method includes removing the existing valve trim, and replacing the removed existing valve trim with a balanced valve trim as described herein. Preferably, the replacement is completed without modifying (such as by re-sizing, machining, and/or changing out) an actuator or valve body of the regulator valve.

In addition, these aspects and arrangements may include any one or more of the following additional aspects and arrangements.

In some arrangements, a second cross-sectional area of the through bore matches with the first cross-sectional area of the flow through orifice of the seat ring. The second cross-sectional area may be the same as the first cross-sectional area or may be larger or smaller than the first cross-sectional area.

In some arrangements, pressure from fluid inside the interior space forms a first effective force at one end of the sleeve and a second effective force at the other end of the sleeve, wherein the first effective force counteracts the second effective force. The first effective force may be directed against the first effective pressure area. The second effective force may be directed against the second effective pressure area. The first effective force may be directed in the opposite direction as the second effective force. The valve disk assembly may define the second effective pressure area. The inner annular shoulder may define the first effective pressure area.

In some arrangements, the plunger is coupled to a housing of the actuator. The plunger may form a fluid tight seal with an inner surface of the through bore. The seal is preferably a sliding or dynamic seal so that the sleeve is able to slide freely relative to the plunger.

In some arrangements, the actuator comprises a diaphragm assembly that is responsive to pressure changes, and the flow control member is coupled to the diaphragm assembly. The sleeve may include a coupling mechanism, such as an outer annular shoulder, that couples the sleeve to the diaphragm assembly. However, other coupling mechanisms that transmit movement of the diaphragm assembly to the sleeve may be used.

In some arrangements, the sleeve has a substantially cylindrical shape extending between the first end and the second end. The sleeve may have a substantially circular cylindrical shape. The sleeve may have a cylindrical sidewall having an inner surface and an outer surface. The inner surface may at least partly define the interior space inside the sleeve. The outer annular shoulder may project radially outwardly from the outer surface. The inner annular should may project radially inwardly from the inner surface. The inner annular shoulder may be disposed near the first end and spaced apart from the second end to at least partially define the interior space. The inner annular shoulder may form an end wall at the first end of the sleeve. A through bore may extend through the inner annular shoulder. The plunger may form a fluid tight seal with an inner surface of the through bore. The inner annular shoulder may have at least one of a rectangular, rounded, or tapered shape projecting inwardly from the inner wall of the sleeve.

In some arrangements, the inner annular shoulder may at least partly define the first effective pressure area. The valve disk assembly may at least partly define the second effective pressure area.

Additional aspects and arrangements will be discernible upon a thorough study of the attached drawings and the following detailed description thereof.

DETAILED DESCRIPTION OF THE DRAWINGS

According to some aspects of the present disclosure, minor modifications to a pressure regulator (i.e, a regulator valve) with a balanced valve trim (i.e., balanced valve assembly) can be made to allow the pressure regulator to be used in an overcapacity flow situation (i.e., used with a flow rate that is at the lower end of, or even below, the flow rate capacity range of the pressure regulator) without causing destructive forces at the sealing surface of the main valve disk.

According to some aspects of the present disclosure, the orifice size of the seat ring may be reduced in order to cause the valve disk assembly to operate spaced further away from the valve seat. This arrangement may eliminate or reduce the extreme velocities that otherwise would cause the most damage to the valve disk or the valve seat.

According to some aspects of the present disclosure, the sleeve is modified to match the area of the seat ring. This arrangement may cause the valve disk assembly to move further away from the seat ring in order to supply the desired flow through the valve body and still allow control of forces applied to the valve disk assembly across a broad range of inlet pressures.

Figure 1:
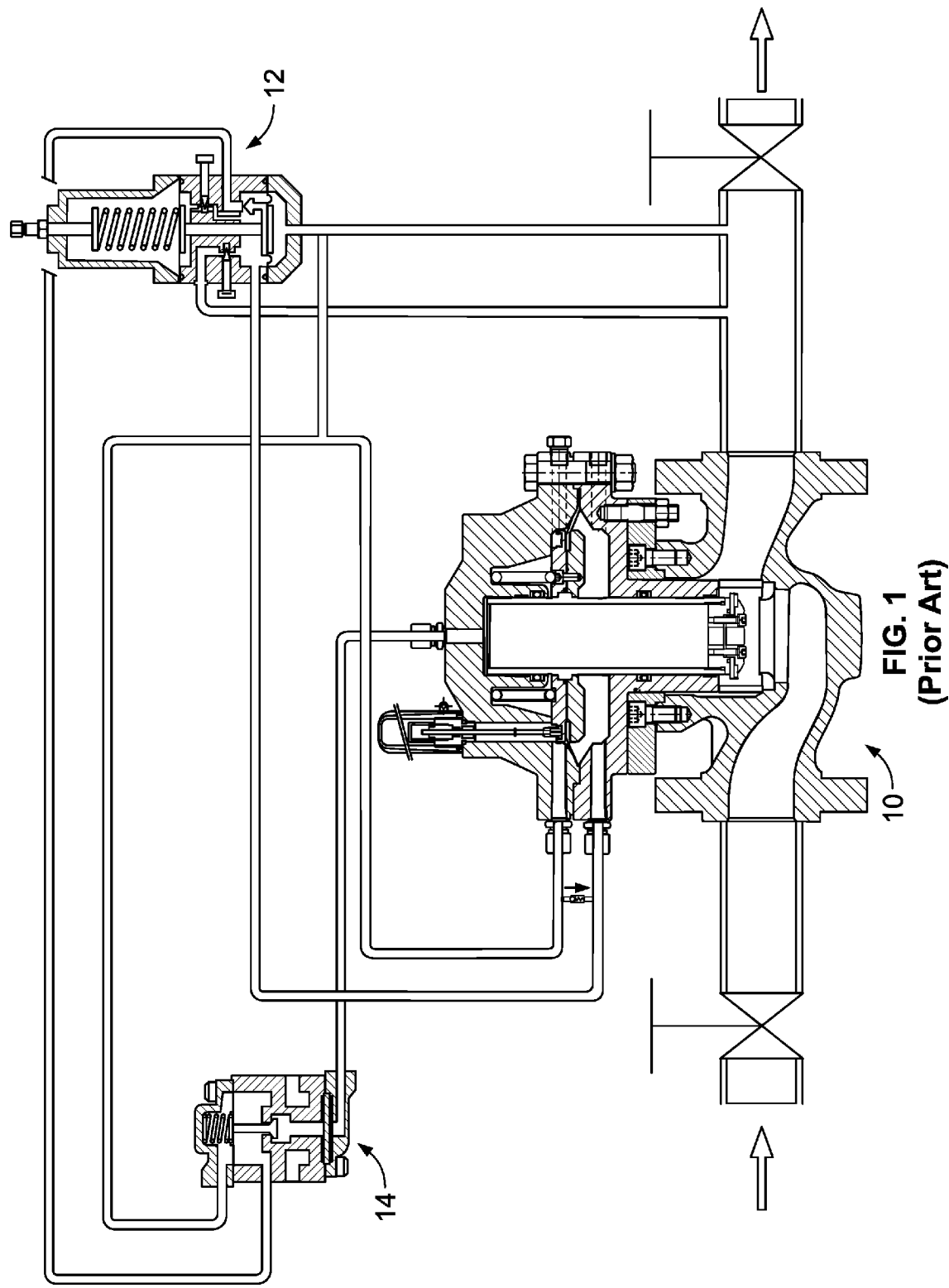
FIG. 1 is a diagrammatic view of a known regulator valve arrangement.
Figure 2:
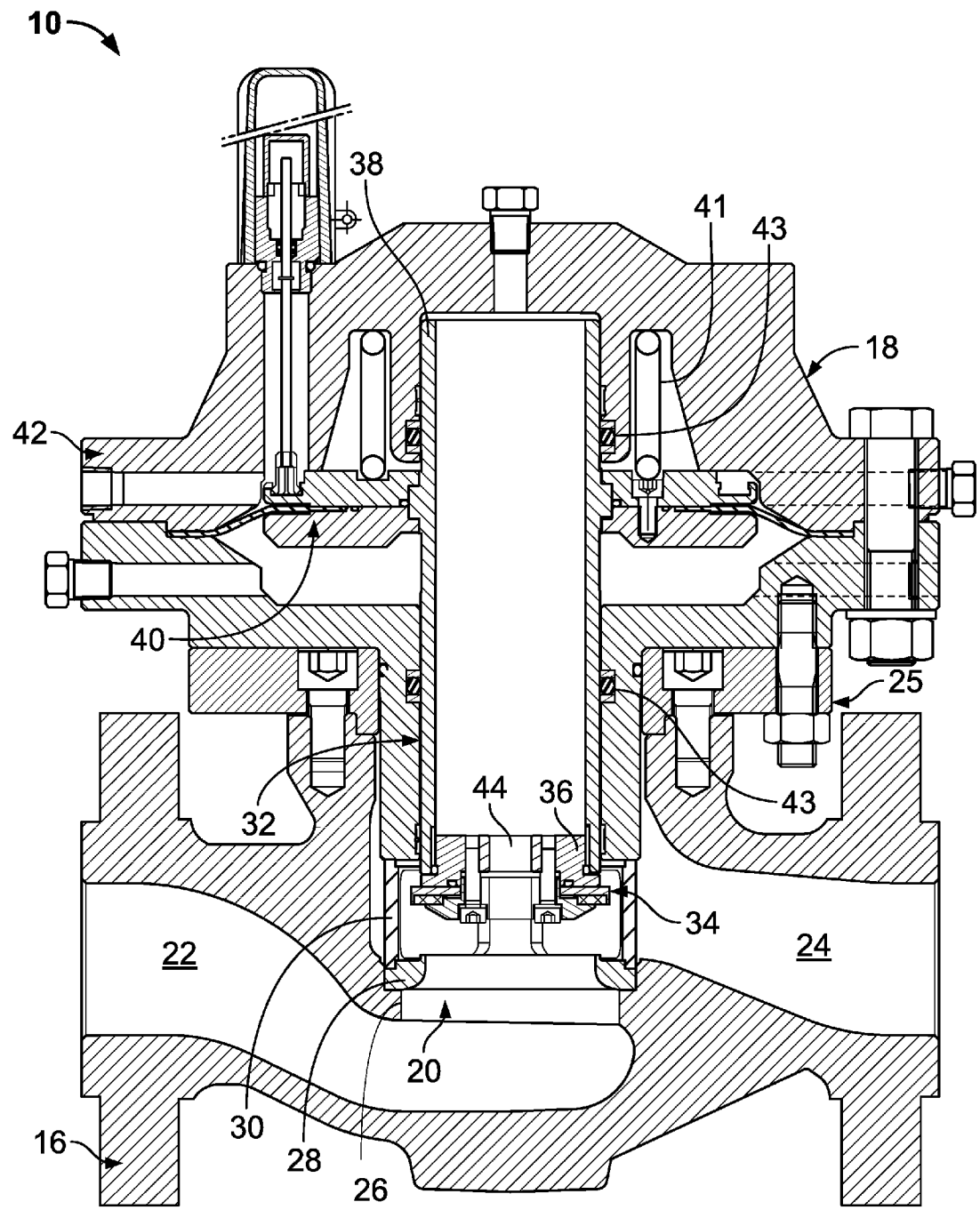
FIG. 2 is an enlarged cross-sectional view of the regulator valve shown in FIG. 1.
Figure 3:
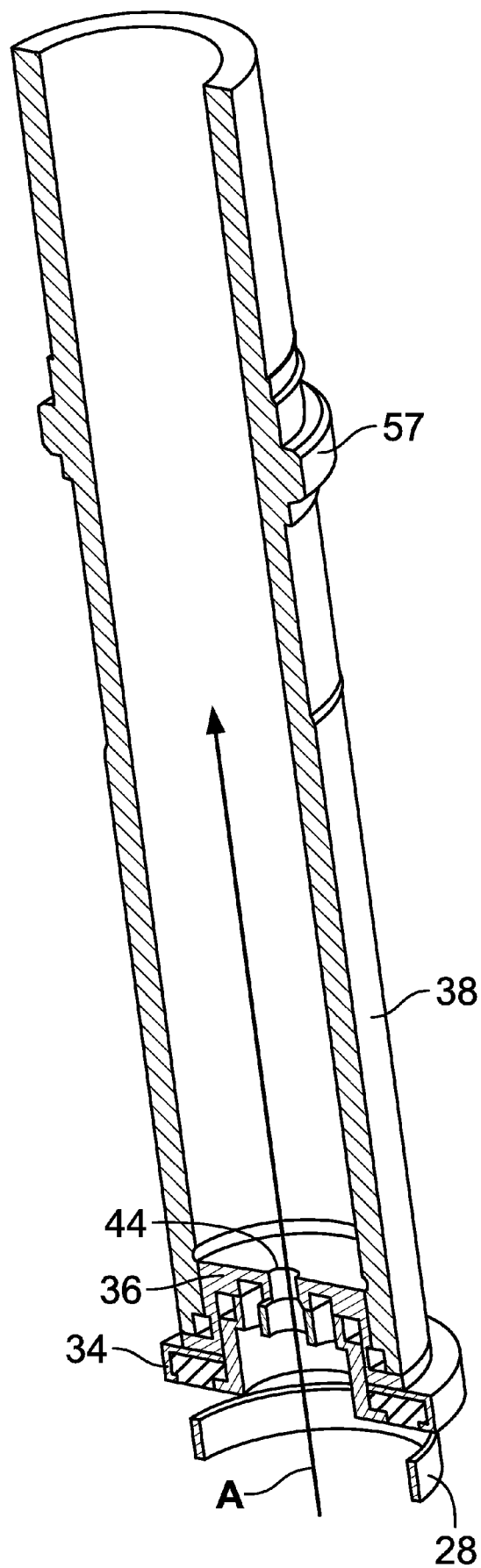
FIG. 3 is an enlarged isometric cross-sectional view of the balanced valve trim assembly of FIG. 2.
Figure 4:
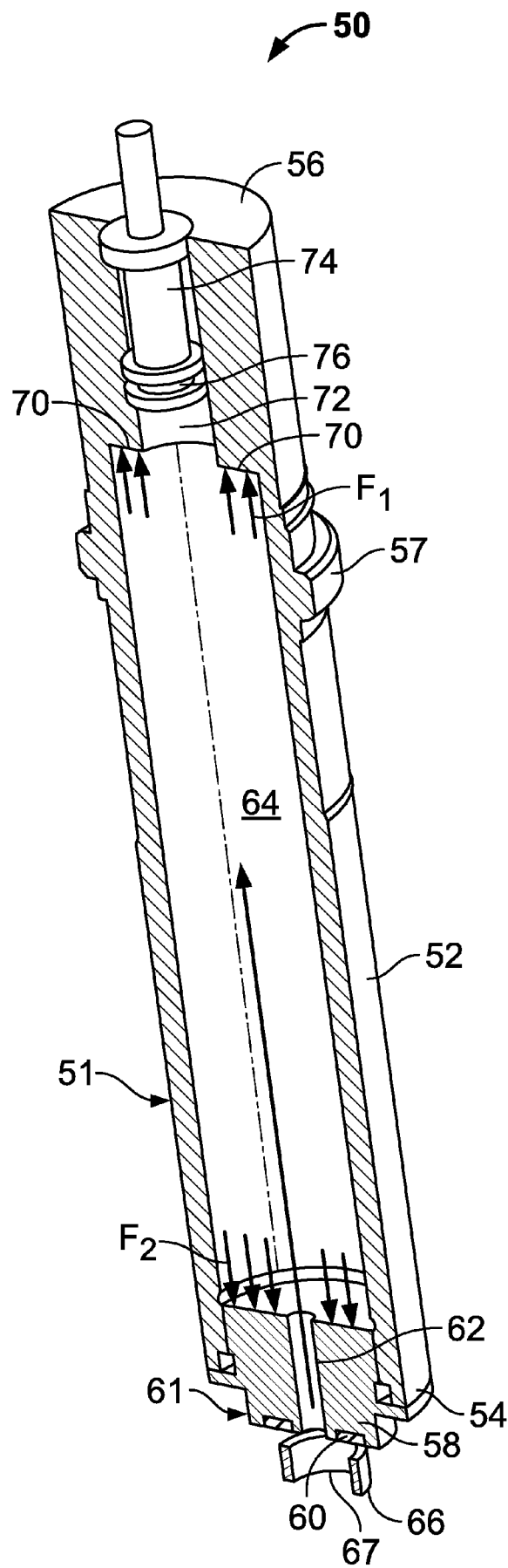
FIG. 4 is an enlarged isometric cross-sectional view of a balanced valve trim assembly according to aspects of the present disclosure.
Figure 5:
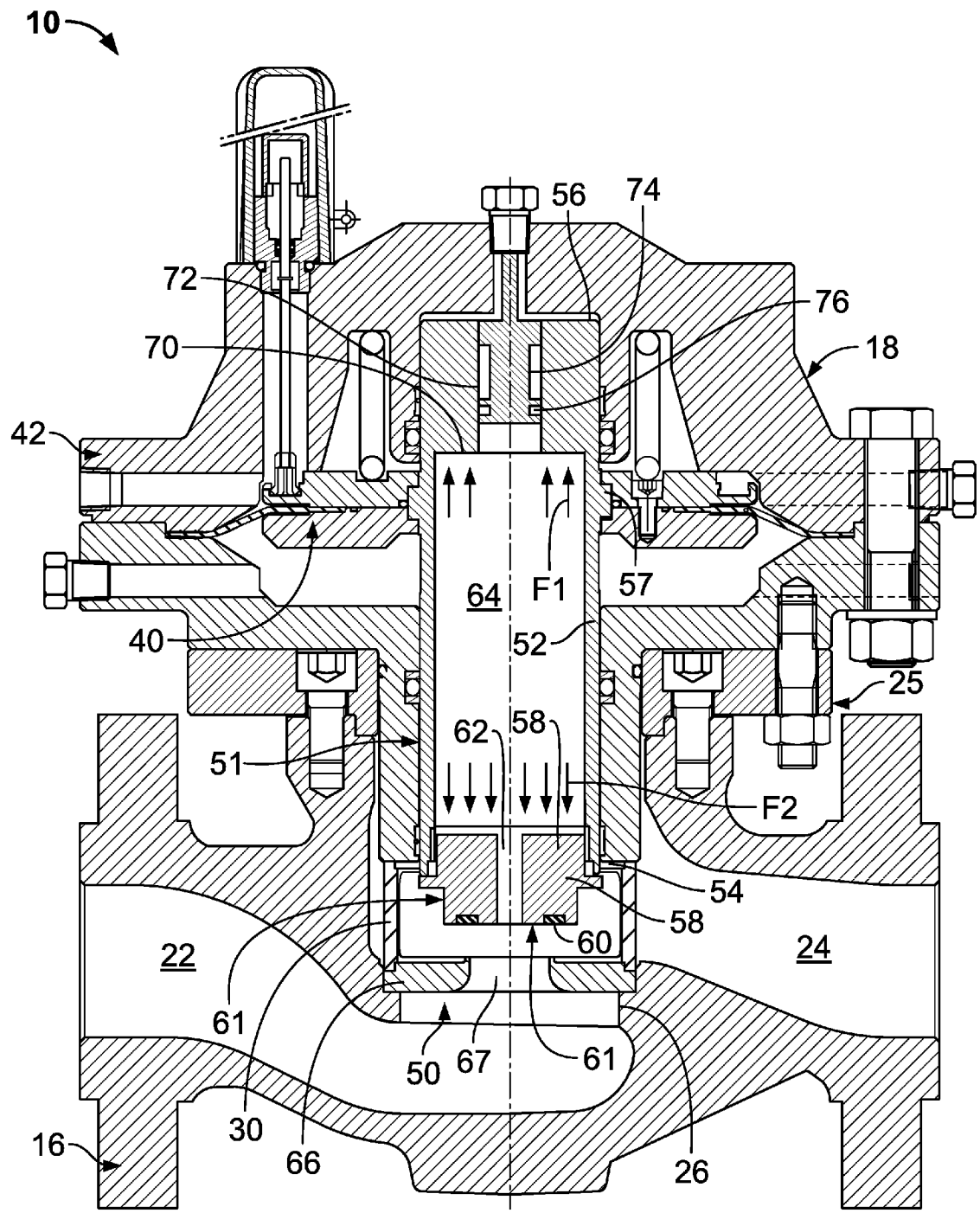
FIG. 5 is a cross-sectional view of a regulator valve including the balanced valve trim of FIG. 4.

Turning now to FIGS. 4 and 5, a new valve trim assembly 50 in an exemplary arrangement according to the present disclosure is provided for use with the pressure regulator valve 10 in lieu of the valve trim assembly 20. The valve trim assembly 50 includes a seat ring 66 that is carried by the valve body 16 at the valve throat 26 and a sliding stem flow control member 51 that is moved up and down by the actuator 18 toward and away from the seat ring 66. The flow control member 51 includes a valve stem, in the form of a sleeve 52, a sleeve adapter 58, and a valve disk 60. The sleeve adapter 58 and the valve disk 60 together form a valve disk assembly 61. The sleeve 52 is in the form of an elongate hollow tube that extends from a lower end 54 to an upper end 56. (All general directional modifiers, such as upper, lower, left, and right, are used solely for purposes of convenience with reference to the drawings as laid out, and are not intended to otherwise limit the disclosure.) Preferably, the sleeve 52 is in the shape of a generally circular cylindrical elongate tube, however other shapes are also possible. The sleeve has a coupling mechanism, such as an outer annular shoulder 57, that couples the sleeve 52 with the diaphragm assembly 40, such that movement of the diaphragm assembly is transmitted directly to the sleeve 52.

The sleeve adapter 58 is disposed within and carried by the lower end 54 of the sleeve 52. A valve disk 60 is carried by the sleeve adapter 58. Each of the sleeve adapter 58 and the valve disk 60 has a central orifice extending therethrough, which are aligned so as to form a passageway 62 fluidly connecting the fluid flow passageway of the valve body 16 and the interior space 64 of the sleeve 52. Fluid in the fluid flow passageway can flow into and/or out of the interior space 64 so as to at least partially balance the fluid pressure forces acting on the valve disk assembly 61 in both the opening direction and the closing direction of the flow control member 51.

The seat ring 66, which forms a valve seat against which the valve disk 60 may sealingly engage, is carried by the valve body 16 in a similar fashion to the seat ring 28. However, the seat ring 66 has a smaller flow through orifice 67 than the seat ring 28, and thereby has a smaller cross sectional area or orifice area than the seat ring 28. In this example, the seat ring 66 forms a circular flow through orifice with a diameter that is smaller than the orifice diameter of the seat ring 28. The smaller orifice area of the seat ring 66 may increase the velocity of fluid flow through the flow through orifice 67 at operating conditions having lower volume flow rates in comparison to the larger orifice area of the seat ring 28.

The sleeve 52 is constructed such that pressure from fluid inside the interior space 64 forms a first effective force F1 on the flow control member 51 and a second effective force F2 on the flow control member 51, wherein the first effective force F1 counteracts the second effective force F2. Thus, the net effective downward balancing forces of the fluid pressure acting on the flow control member 51 are relatively less than the net effective downward balancing forces of the same fluid pressure that would, for example, act on the flow control member 32. This allows the flow control member 51 to have an equilibrium position at a given fluid flow rate through the valve body 16 that is spaced a little farther away from the seat ring 66 than would be provided by the flow control member 32 under the same flow conditions, thereby reducing the chances of unwanted flutter of the valve disk 60 against the seat ring 66 at lower flow rates of the fluid through the valve body 16.

The first effective force F1 and the second effective force F2 can be developed in many different ways. In general terms, the interior space 64 of the sleeve 52 is shaped so as to create a first effective pressure area at the first end of the interior space 64, and a second effective pressure area at the second end of the interior space, wherein the second effective pressure area opposes the first effective pressure area. Each of the first and second effective pressure areas can be formed by one or more interior surfaces in the interior space 64. In the present exemplary arrangement, The first effective pressure area is formed by an inner annular shoulder 70 projecting inwardly from the inner surface of the sidewall of the sleeve 52 near the upper end 56. The second effective pressure area is formed by the interior surface of the valve disk assembly 61, and in particular, by the back side of the sleeve adapter 58. However, the first and second effective pressure areas could be formed by other surfaces and need not be limited to the specific shapes or surfaces shown in the drawings in order to function. For example, one or both of the first and second effective pressure areas could be formed by other shaped surfaces, such as rounded surfaces or tapered surfaces extending inwardly from the inner surface of the sleeve 52.

In the exemplary arrangement of the figures, the inner annular shoulder 70 is disposed on the interior surface of the sleeve 52 at or near the upper end 56 of the sleeve 52. The inner annular shoulder 70 forms a through bore 72 at the upper end 56 of the sleeve 52. The through bore 72 has a cross sectional area that is smaller than the cross-sectional area of the interior space 64. Thus, the inner annular shoulder 70 forms the first effective pressure area against which the first effective force F1 acts between the inner surface of the sleeve 52 and the through bore 72. In the present arrangement, the inner annular shoulder 70 has a rectangular shape projecting inwardly from the inner surface of the side wall of the sleeve 52; however, the inner annular shoulder 70 is not limited to this rectangular cross-sectional shape, but rather may also or alternatively have other shapes, such as a rounded shape and/or tapered shape, projecting inwardly from the inner surface of the side wall of the sleeve 52. The main thing is that the inner annular shoulder 70 forms one or more surfaces against which the first effective force F1 can develop to urge the flow control member 51 in the upward direction (as shown in the drawings).

The cross-sectional area of the through bore 72 matches the cross-sectional area of the seat ring 66 in a way to most effectively balance the balancing forces F1 and F2 arising within the sleeve 52 relative to forces exerted on the inlet side of the valve disk assembly 61. In some arrangements, the cross-sectional area of the through bore 72 is equal to the cross-sectional area of the flow through orifice 67 of the seat ring 66; however in other arrangements cross-sectional area of the through bore 72 may be larger or smaller than the cross-sectional area of flow through orifice 67, depending upon the desired balancing characteristics and net effective force desired to be developed on the flow control member 51.

A plunger 74 is slidingly disposed within the through bore 72 and arranged so as to be fixed relative to the valve body 16. In the present arrangement, the plunger 74 is coupled to the actuator 18, for example by being attached to the upper portion of the actuator housing 42, and extends into the through bore 72. However, other arrangements may also be used to maintain the plunger in a fixed position relative to the valve body 16. A fluid-tight seal may be formed between the plunger 74 and the interior surface of the through bore 72, for example with a seal 76, such as an O-ring, carried by the plunger 74. As the sleeve 52 travels up and down in response to movement of the diaphragm assembly 40, the through bore 72 slides axially up-and-down along the plunger 74. In the present arrangement, the through bore 72 has an axial length at least as long and preferably longer than the longest possible travel distance of the sleeve 52 between the fully closed position and the fully open position such that the plunger 74 is always sealingly engaged against the interior surface of the through bore 72 along the entire travel length of the sleeve 52. In other arrangements, the inner annular shoulder 70 may form a seal against the plunger, such as by carrying an O-ring, and the plunger may be longer than the through bore 72. In such an arrangement, the plunger 74 may have a length at least as long as the largest travel distance of the sleeve 52 so that the inner annular shoulder 70 is always sealingly engaged against the plunger 74. In any arrangement, the plunger 74 forms another effective pressure area which does not effectively act upon the flow control member 51, because the plunger 74 slides relative to the flow control member 51.

With this arrangement, a set of upwardly acting forces F1 arising from the fluid entering the interior space 64 of the sleeve 52 from the fluid flow passageway of the valve body 16 act in an upward direction against the inner annular shoulder 70. Thus, these upwardly acting forces F1 urge the sleeve 52 upwardly, thereby moving the valve disk 60 further away from the seat ring 66. The upwardly acting forces F1 are opposite to and counterbalance the downwardly acting forces F2 arising from the fluid in the interior space 64 engaging against the upper surface of the sleeve adapter 58. Because the plunger 74 is fixedly attached to the upper portion of the actuator housing 42, the fluid pressure acting on the area of the plunger 74, which preferably corresponds with the cross-sectional area of the through bore 72, does not act to counterbalance the downwardly acting forces F2. Therefore, in contrast to the sleeve 38, the sleeve 52 provides a smaller net effective downwardly acting force (i.e., F2–F1) on the flow control member 51 assembly under the same fluid flow conditions through the fluid flow passageway of the valve body 16. This in turn causes the valve disk 62 to have an equilibrium position that is spaced farther apart from the seat ring 66 than if the sleeve 38 without the inner annular shoulder were to be used under the same flow conditions. By causing the valve disk 62 to ride spaced farther apart from the seat ring 66, the valve trim assembly 50 of the present disclosure can reduce long-term wear on the seat ring 66 and/or the valve disk 60 under lower volume flow conditions without having to change the actuator 18 and the valve body 16.

The cross-sectional area of the sleeve adapter 58 against which the downwardly acting forces F2 and/or the cross-sectional area of the through bore 72 and/or the cross-sectional area of the inner annular shoulder 70 may be adjusted to meet various force balancing conditions.

In order to change the pressure regulator valve 10 to better accommodate a lower volume flow rate through the valve body 16, a method of modifying the regulator valve 10 may include removing the valve trim assembly 20 from the valve body 16, and replacing the removed valve trim assembly 20 with the valve trim assembly 50. Because the exterior surfaces of the sleeve 52 are substantially the same as the exterior surfaces of the sleeve 38, the valve trim assembly 50 is easily retrofitted to operatively fit with the actuator 18 and the valve body 16. Therefore, when the operating conditions of a particular pipe line in which the pressure regulator valve 10 is installed are changed so as to have a lower volume flow rate, the pressure regulator valve 10 can be modified to better accommodate the new operating conditions without having to change the size of or otherwise substantially modify the valve body 16 and/or the actuator 18.

An exemplary set of steps for removing the valve trim assembly 20 may include removing the actuator 18 and the flow control device 32 from the valve body 16. The cage 30 may then be removed from the body 16, for example by sliding it upwardly through the vertical bore extending upwardly above the throat 26. The seat 28 may then be removed from the valve body 16, for example by also sliding it upwardly through the same vertical bore. The flow control device 32 may be decoupled from the diaphragm assembly 40, for example, by unclamping the diaphragm plates from the outer annular shoulder on the sleeve 38.

An exemplary set of steps for replacing the removed valve trim assembly 20 with the valve trim assembly 50 may include placing the seat ring 66 operatively in the valve body 16, for example at the throat 26. The cage 30 may be operatively placed on the seat ring 66. The flow control member 51 may be operatively coupled to the diaphragm assembly 40, for example, by clamping the diaphragm plates to the outer annular shoulder 57 on the sleeve 52 and reassembling the actuator 18. The flow control member 51 and the actuator may be operatively reattached to the valve body 16, for example by inserting the flow control member 51 and the lower portion of the actuator housing 42 into the vertical bore extending upwardly above the throat 26 so that the valve disk assembly 61 will operatively engage with the seat ring 66 and coupling the actuator housing 42 to the bonnet 25.

The above-detailed steps of removing and replacing the valve trim assemblies 20 and 50 are only exemplary and the methods thereof are not limited to the above-detailed steps. Many other arrangement of steps can be taken to both remove the valve trim assembly 20 from the regulator valve 10 and to replace it with the valve trim assembly 50 so as to be appropriately operative.

The exemplary arrangement shown in the drawings and described in detail herein are not intended to be limiting of the invention, but rather a provided as just one example out of many possible arrangements to enable the person of ordinary skill to make and use the invention. Additional arrangements, combinations of features, and/or advantages of the invention are contemplated within the scope of the claims appended hereto.

We claim:

1. A regulator valve, comprising:
    a valve body defining a fluid flow passage having a valve throat disposed between an inlet and an outlet;
    an actuator operatively coupled to the valve body; and
    a balanced valve trim comprising:
        a seat ring coupled to the valve body, the seat ring defining a flow through orifice having a first cross-sectional area; and
        a flow control member, the flow control member including a sleeve operatively connected to the actuator so as to move a valve disk assembly toward and away from the seat ring so as to control flow of fluid through the fluid flow passage, the sleeve having an interior space disposed between a first end of the sleeve and a second end of the sleeve, the valve disk assembly disposed at the second end of the sleeve, an inner annular shoulder disposed toward the first end of the sleeve and spaced apart from the valve disk assembly to at least partially define the interior space, and a through bore extending through the inner annular shoulder, wherein the valve disk assembly includes a passageway to provide fluid communication between the fluid flow passage and the interior space; and
        a plunger slidingly disposed within the through bore and fixed relative to the valve body, wherein the flow through orifice of the seat ring has the first cross-sectional area and the through bore has a second cross-sectional area that is the same as the first cross-sectional area.

2. The regulator valve of claim 1, wherein the inner annular shoulder defines a first effective pressure area, and the valve disk assembly defines a second effective pressure area opposing the first effective pressure area.

3. The regulator valve of claim 1, wherein pressure from fluid inside the interior space forms a first effective force at the first end of the sleeve and a second effective force at the second end of the sleeve, wherein the first effective force counteracts the second effective force.

4. The regulator valve of claim 1, wherein the inner annular shoulder has at least one of a rectangular, rounded, or tapered shape projecting inwardly from an inner wall of the sleeve.

5. The regulator valve of claim 1, wherein the plunger is coupled to a housing of the actuator.

6. The regulator valve of claim 1, wherein the actuator comprises a diaphragm assembly that is responsive to pressure changes, and the flow control member is coupled to the diaphragm assembly.

7. The regulator valve of claim 1, wherein the sleeve has a substantially cylindrical shape extending between the first end and the second end.

8. A regulator valve comprising,
    a valve body defining a fluid flow passage having a valve throat disposed between an inlet and an outlet;
    an actuator operatively coupled to the valve body; and
    a balanced valve trim comprising:
        a seat ring coupled to the valve body, the seat ring defining a flow through orifice having a first cross-sectional area; and
        a flow control member, the flow control member including a sleeve operatively connected to the actuator so as to move a valve disk assembly toward and away from the seat ring so as to control flow of fluid through the fluid flow passage, the sleeve having an interior space disposed between a first end of the sleeve and a second end of the sleeve, the valve disk assembly disposed at the second end of the sleeve, an inner annular shoulder disposed toward the first end of the sleeve and spaced apart from the valve disk assembly to at least partially define the interior space, and a through bore extending through the inner annular shoulder, wherein the valve disk assembly includes a passageway to provide fluid communication between the fluid flow passage and the interior space; and
        a plunger slidingly disposed within the through bore and fixed relative to the valve body,
    wherein the plunger forms a seal with an inner surface of the through bore.

9. The regulator valve of claim 8, wherein the inner annular shoulder defines a first effective pressure area, and the valve disk assembly defines a second effective pressure area opposing the first effective pressure area.

10. The regulator valve of claim 8, wherein pressure from fluid inside the interior space forms a first effective force at the first end of the sleeve and a second effective force at the second end of the sleeve, wherein the first effective force counteracts the second effective force.

11. The regulator valve of claim 8, wherein the inner annular shoulder has at least one of a rectangular, rounded, or tapered shape projecting inwardly from an inner wall of the sleeve.

12. The regulator valve of claim 8, wherein the plunger is coupled to a housing of the actuator.

13. The regulator valve of claim 8, wherein the actuator comprises a diaphragm assembly that is responsive to pressure changes, and the flow control member is coupled to the diaphragm assembly.

14. The regulator valve of claim 8, wherein the sleeve has a substantially cylindrical shape extending between the first end and the second end.

15. A balanced valve trim for a regulator valve, comprising:
   a seat defining a flow through orifice for fluid flowing through a valve body; and
   a flow control member for controlling flow of the fluid through the flow through orifice, the flow control member including:
      a sleeve to be operatively connected to an actuator so as to move toward and away from the seat, the sleeve having a first end, a second end opposite the first end, an interior space extending along the sleeve between the first end and the second end, an inner annular shoulder disposed between the first end and the second end to at least partially define the interior space, and a through bore extending through the inner annular shoulder;
      a valve disk assembly disposed at the second end and arranged to engage the seat, wherein the valve disk assembly includes a passageway to provide fluid communication with the interior space; and
      a plunger having a first end disposed in the through bore and a second end disposed outside of the through bore,
      wherein a first effective pressure area is defined at the first end of the interior space, and a second effective pressure area is defined at the second end of the interior space, and the second effective pressure area opposes the first effective pressure area.

16. The balanced valve trim of claim 15, wherein the inner annular shoulder is disposed near the first end of the sleeve, wherein the inner annular shoulder at least partly defines the first effective pressure area, and wherein the plunger is to be slidingly disposed within the through bore and to be fixed relative to the valve body.

17. The balanced valve trim of claim 16, wherein the plunger forms a fluid tight seal with an inner surface of the through bore.

18. The balanced valve trim of claim 15, wherein the inner annular shoulder has at least one of a rectangular, rounded, or tapered shape projecting inwardly from an inner wall of the sleeve.

19. The balanced valve trim of claim 15, wherein pressure from fluid inside the interior space forms a first effective force against the first effective pressure area and a second effective force against the second effective pressure area, wherein the first effective force counteracts the second effective force.

20. A method of modifying a pressure regulator valve having an existing balanced valve trim with a sliding valve stem in the form of a sleeve, the method comprising:
   removing the existing valve trim; and
   replacing the removed existing valve trim with the balanced valve trim of claim 15.

* * * * *

UNITED STATES PATENT AND TRADEMARK OFFICE
CERTIFICATE OF CORRECTION

| | | |
|---|---|---|
| PATENT NO. | : 9,989,977 B2 | Page 1 of 1 |
| APPLICATION NO. | : 15/007803 | |
| DATED | : June 5, 2018 | |
| INVENTOR(S) | : Daniel G. Roper et al. | |

It is certified that error appears in the above-identified patent and that said Letters Patent is hereby corrected as shown below:

In the Specification

At Column 2, Line 20, "member 20" should be -- member 32 --.

At Column 4, Line 11, "a the first end" should be -- the first end --.

At Column 5, Line 8, "annular should" should be -- annular shoulder --.

At Column 7, Line 5, "arrangement, The" should be -- arrangement, the --.

At Column 8, Lines 35-36, "valve disk 62" should be -- valve disk 60 --.

At Column 8, Line 39, "valve disk 62" should be -- valve disk 60 --.

In the Claims

At Column 10, Line 27, "comprising," should be -- comprising: --.

Signed and Sealed this
Twenty-first Day of April, 2020

Andrei Iancu
*Director of the United States Patent and Trademark Office*